United States Patent [19]
Avila et al.

[11] Patent Number: 5,749,554
[45] Date of Patent: May 12, 1998

[54] TRAY ASSEMBLY

[75] Inventors: Javier Avila, Troy; James Andrew Obermeyer, Dayton; Michael H. Speck, Troy, all of Ohio; Ronald Henry Dybalski, Royal Oak, Mich.

[73] Assignee: General Motors Corporation, Detroit, Mich.

[21] Appl. No.: 650,537

[22] Filed: May 20, 1996

[51] Int. Cl.⁶ ............................................. B60N 3/10
[52] U.S. Cl. ................ 248/311.2; 224/281; 297/188.17
[58] Field of Search .......................... 248/311.2, 313, 248/293, 154, 230.6; 224/281; 297/188.17

[56] References Cited

U.S. PATENT DOCUMENTS

| | | | |
|---|---|---|---|
| 4,583,707 | 4/1986 | Anderson | 248/293 |
| 4,896,858 | 1/1990 | Sokolski et al. | 248/311.2 |
| 4,919,381 | 4/1990 | Buist | 248/154 |
| 4,953,771 | 9/1990 | Fischer et al. | 224/273 |
| 4,981,277 | 1/1991 | Elwell | 248/311.2 |
| 5,024,411 | 6/1991 | Elwell | 248/311.2 |
| 5,054,733 | 10/1991 | Shields | 248/313 |
| 5,143,338 | 9/1992 | Eberlin | 248/313 |
| 5,170,980 | 12/1992 | Burrows et al. | 248/311.2 |
| 5,259,580 | 11/1993 | Anderson et al. | 248/311.2 |
| 5,297,709 | 3/1994 | Dykstra et al. | 224/281 |
| 5,297,767 | 3/1994 | Miller et al. | 248/311.2 |
| 5,330,146 | 7/1994 | Spykerman | 248/311.2 |
| 5,385,325 | 1/1995 | Rigsby | 248/313 |
| 5,390,887 | 2/1995 | Campbell | 248/311.2 |
| 5,398,898 | 3/1995 | Bever | 248/154 |
| 5,474,272 | 12/1995 | Thompson et al. | 248/311.2 |
| 5,487,519 | 1/1996 | Grabowski | 248/311.2 |
| 5,489,054 | 2/1996 | Schiff | 224/281 |
| 5,505,417 | 4/1996 | Plocher | 248/311.2 |
| 5,511,755 | 4/1996 | Spykerman | 248/311.2 |
| 5,562,049 | 10/1996 | Hoffman et al. | 108/94 |
| 5,628,486 | 5/1997 | Rossman et al. | 248/311.2 |

OTHER PUBLICATIONS

Automotive News Magazine, May 13, 1996 article entitled Car cup capers continue with icy/hot option — cover page and p. 42.
Article entitled "Aladdin designs one-size-fits most holder " p. 42.

Primary Examiner—Leslie A. Braun
Assistant Examiner—Donald J. Wallace
Attorney, Agent, or Firm—Kathryn A. Marra

[57] ABSTRACT

A tray assembly is provided for use in a vehicle having a recessed compartment. The tray assembly includes a housing slidably mounted on the recessed compartment for movement between an open position and a closed position in which the housing is substantially concealed within the recessed compartment. The tray assembly includes generally planar tray portions pivotally connected to the housing for movement between a laterally outward deployed position when the housing is in the open position and a laterally inward folded position when the housing is in the closed position. A cupholder portion is disposed on the housing. The cupholder portion is preferably located between tray portions when the tray portions are in the deployed position.

17 Claims, 6 Drawing Sheets

TRAY ASSEMBLY

This invention relates to a tray assembly for use in a vehicle.

BACKGROUND OF THE INVENTION

It is well known in motor vehicles to provide cupholders for holding a container in various locations in the vehicle. Typically the cupholders are mounted in a stationary location such as a center console, the inner surface of a glove box door, or on an instrument panel. It is also known in the prior art to provide a movable cupholder that slides in and out of a recess in the instrument panel which is revealed when in use and which can be pushed into storage when not in use. While motor vehicles typically have ample locations for placement of containers by the driver or passenger, they do not typically have a convenient location for accessibly placing food or other small articles.

It is also typical in motor vehicles, to provide a recessed compartment in the instrument panel which can be used for storage of small articles or for mounting a radio or other electronic devices. Most vehicles have several storage locations and built-in electronic equipment such that the recessed compartment in the instrument panel is not fully utilized.

SUMMARY OF THE INVENTION

This invention provides a tray assembly which utilizes the recessed compartment of the instrument panel and provides a convenient location for holding containers as well as food for both the driver and the passenger. Advantageously, the tray assembly is easily accessible by both the driver and passenger when in use and conveniently is stored out of sight when not in use. Also advantageously, the tray assembly is adapted for use in standard recessed compartments in instrument panels which are designed for otherwise holding a radio or other electronic equipment. The tray assembly of the present invention is designed to be lightweight, easy to assemble, and easily adaptable for use in existing instrument panels. Advantageously, the entire tray assembly is preferably snapped and pressed together without the use of traditional mechanical fasteners and without the use of tools for ease of assembly.

A tray assembly is provided for use in a vehicle having a recessed compartment. The tray assembly includes a housing slidably mounted on the recessed compartment for movement between an open position in which the housing is substantially outside the recessed compartment and a closed position in which the housing is substantially concealed within the recessed compartment. The tray assembly includes at least one generally planar tray portion pivotally connected to the housing for movement between a laterally outward deployed position when the housing is in the open position and a laterally inward folded position when the housing is in the closed position.

Preferably, the tray assembly includes first and second tray portions. Also preferably, a cupholder portion is disposed on the housing. The cupholder portion is preferably located between the first and second tray portions when the tray portions are in the deployed position.

According to a preferred aspect, the tray assembly includes pivot pins for pivotally mounting the tray portions to the housing. A single pivot pin may be used to mount both trays to the housing or the pivot pins may be laterally spaced apart and each used to mount one of the tray portions to the housing. The tray assembly also preferably includes springs for biasing the tray portions laterally outward towards the deployed position.

In accordance with other preferred aspects, the tray assembly includes a support frame secured within the recessed compartment and first and second track members are mounted on the support frame. The housing is then slidably mounted on the track members. Preferably, the track members each include a channel portion thereon and the housing includes a pair of corresponding guide rails thereon for sliding movement within the channel portions. The channel portions each preferably include a detent portion having ends connected to the track members and having middle portions defining gaps such that the middle portions of the detent portions flexibly engage the guide rails when moving within the channel portions.

Also preferably, the tray assembly includes a cupholder portion on the housing and positioned between the first and second tray portions when the housing is in the open position and the tray portions are in the deployed position. Preferably, the tray portions have inner edges spaced above the cupholder portion and the inner edges cooperatively vertically extend the height of the cupholder portion.

In accordance with yet another preferred aspect, the tray portions each include an upper tray portion and a lower tray portion. Each respective pair of upper and lower tray portions are vertically spaced apart by a support span. The tray portions are stored in a stacked condition in the overlapped position with one of the upper tray portions spaced vertically above the other of the upper tray portions and one of the lower tray portions spaced vertically below the other of the upper tray portions and vertically above the other of the lower tray portions.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
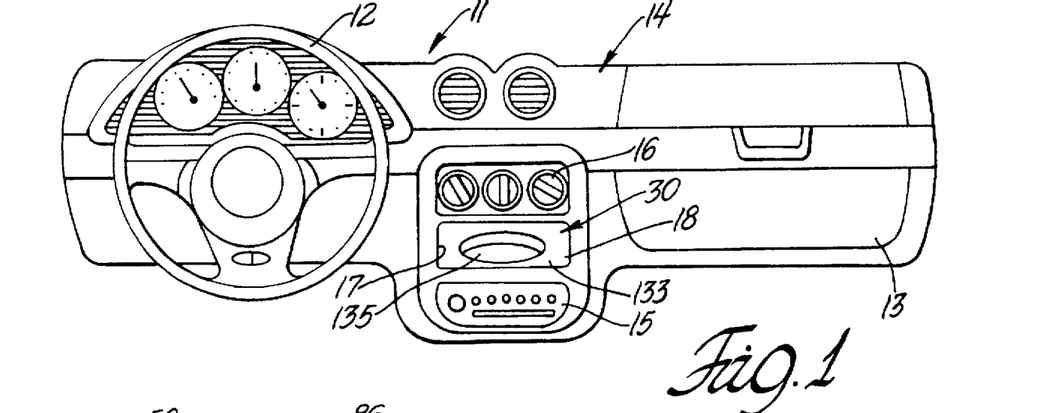
FIG. 1 is a front view of an instrument panel in a vehicle interior including a tray assembly with the housing in the closed position.
Figure 2:
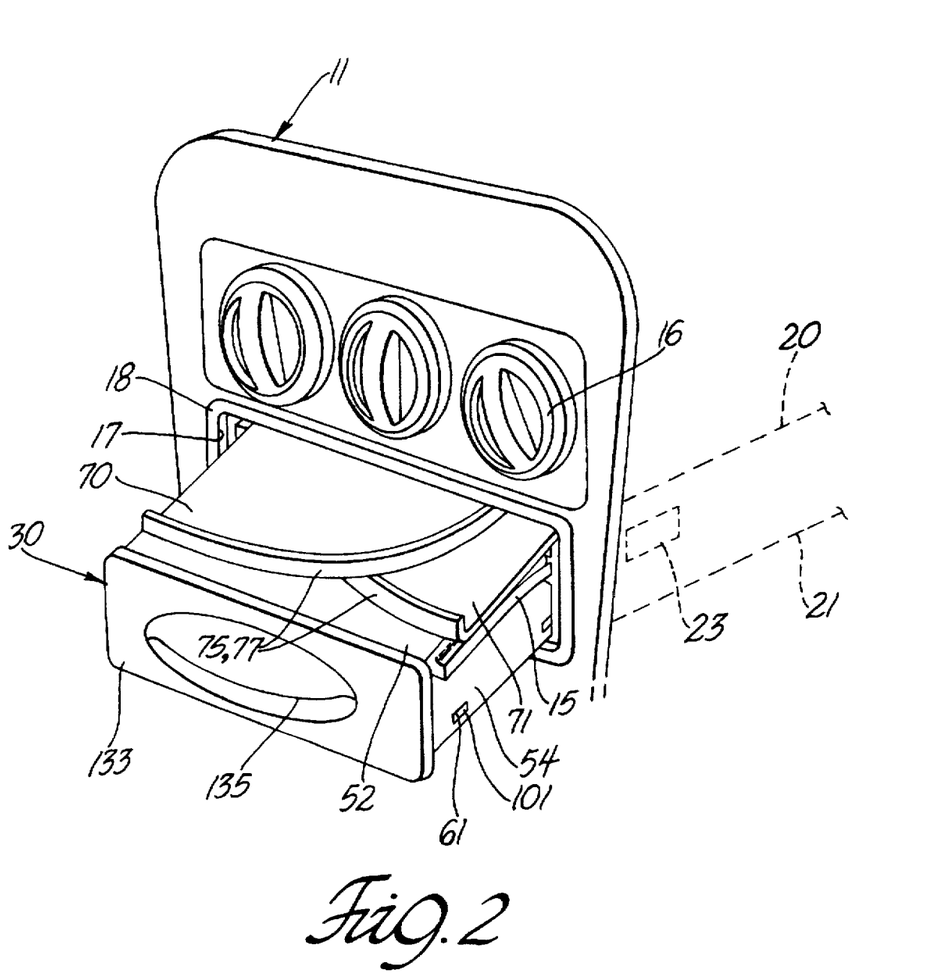
FIG. 2 is a perspective view of the instrument panel partially-broken-away including the tray assembly with the housing in a partially open position and tray portions in an overlapped position and with a recessed compartment of the instrument panel shown in phantom lines.

Referring to FIG. 1, it is seen that a vehicle includes an instrument panel 11 having a steering wheel 12 located forward a vehicle driver (not shown) and a glove box 13 located forward a vehicle passenger (not shown). The instrument panel 11 further includes a central portion 14 generally centered between the steering wheel 12 and the glovebox 13. The central portion 14 of the instrument panel 11 preferably includes a radio 15 and a plurality of knobs controls 16, such as for heating and cooling. The central portion 14 of the instrument panel 11 includes a recessed compartment 20 in which a tray assembly 30 is stored, as shown in FIG. 1 and as described in detail hereinafter. As best shown in FIG. 2, the recessed compartment 20 is angled downwardly about 20-25 degrees relative to horizontal such that the tray assembly 30 or other items inserted within the recessed compartment 20 are partially held therein during sudden vehicle deceleration by friction and gravity.

As best shown in FIG. 2, the recessed compartment 20 defines a rearward facing instrument panel opening 17 preferably surrounded by a decorative trim portion 18. The recessed compartment 20 is generally box-shaped and includes opposing side walls 21 each including a mounting slot 23 therein for receiving a mating feature on the tray assembly 30, as described further hereinafter. The recessed compartment 20 preferably has dimensions to fit a typical standard-sized single radio.

Figures 6, 7, 8:
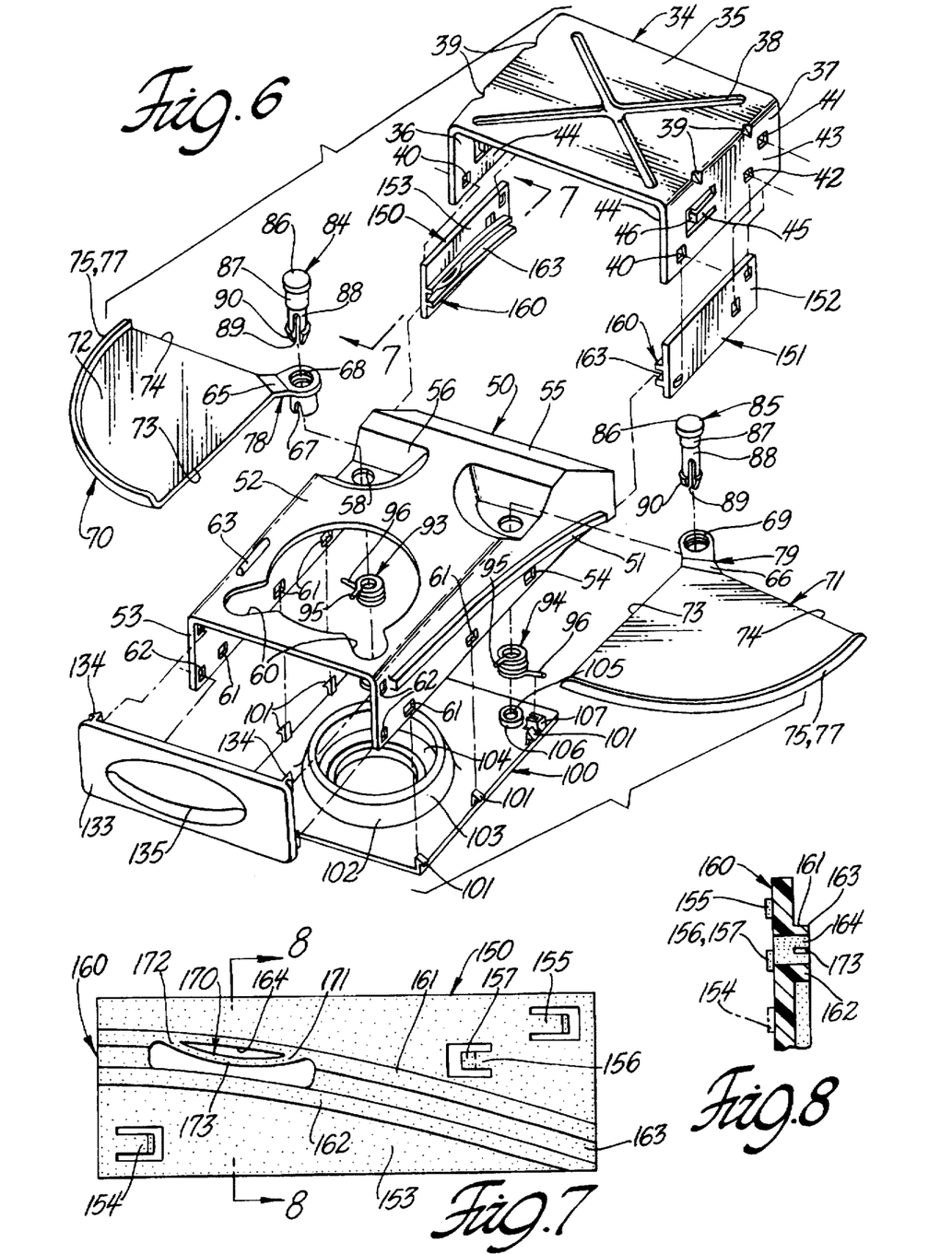
FIG. 6 is an exploded perspective view of the tray assembly.
FIG. 7 is a view taken along line 7—7 of FIG. 6.
FIG. 8 is sectional view taken along line 8—8 of FIG. 8.

Referring to FIGS. 2 and 6, the tray assembly 30 includes the component parts of a support frame 34 secured to the recessed compartment 20 of the instrument panel 11, first and second track members 150, 151 mounted on the support frame 34, a housing 50 slidably mounted on the track members 150, 151, first and second tray portions 70, 71 pivotally mounted on the housing 50, first and second pivot pins 84, 85 for pivotally securing the tray portions 70, 71 to the housing 50, first and second tray springs 93, 94 for biasing the tray portions 70, 71, a cup plate 100 secured to the housing 50, and a decorative face plate 133 secured to the housing 50, each described in detail hereinafter. The tray assembly 30 has an overall size and shape of a typical standard-sized radio, such that the tray assembly 30 may be stored within the similarly-sized recessed compartment 20 in the instrument panel 11.

Referring to FIG. 6, the support frame 34 is generally channel-shaped and includes an upper frame wall 35 and first and second side frame walls 36, 37. The support frame 34 is preferably formed from sheet metal for strength, but may also be integrally molded from a plastic material. The upper frame wall 35 preferably includes an X-shaped reinforcement rib 38 for torsional stability. The intersections between the upper frame wall 35 and the side frame walls 36, 37 may each include a plurality of reinforcement gussets 39 for stability of the side frame walls 36, 37. As best shown in FIG. 6, each of the side frame walls 36, 37 includes forward, rearward and central apertures, 40, 41, 42 respectively, for receiving mating features of the track members 150, 151 therein, as described further hereinafter. The side frame walls 36, 37 each include an outer surface 43 and an inner surface 44. The side frame walls 36, 37 each include a flexible, longitudinally-extending, L-shaped spring finger 45 which is normally biased outwardly away from the outer surfaces 43 of the respective side frame walls 36, 37. The support frame 34 is sized for receipt within the recessed compartment 20 of the instrument panel 11. The spring fingers 45 each include a forward end integrally attached to the support frame 34 and a rearward end having a bent tip 46 thereon. The spring fingers 45 are each longitudinally and vertically positioned on the respective side frame walls 36, 37 such that the rearward ends of the spring fingers 45 flex laterally inward upon insertion of the support frame 34 into the recessed compartment and then snap outwardly into the corresponding mounting slots 23 on the side walls 21 of the recessed compartment 20. Upon complete insertion of the support frame 34 into the recessed compartment 20, the bent tips 46 of the spring fingers 45 each engage the mounting slots 23 on the side walls 21 of the recessed compartment 20 such that rearward movement of the support frame 34 relative the instrument panel 11 is prevented.

As best shown in FIG. 6, the tray assembly 30 includes first and second track members 150, 151 which are secured by snap-fitted attachment to the first and second side frame walls 36, 37, respectively. The track members 150, 151 are each preferably integrally molded as one piece from a plastic material having high lubricity, such as acetal. The track members 150, 151 each include an outer track surface 152 and an opposite inner track surface 153. As best shown in FIGS. 6 and 7, each of the track members 150, 151 includes mating features for snap-fitted connection of the track members 150, 151 onto the side frame walls 36, 37 including forward, rearward and central tabs 154, 155, 156, respectively, projecting laterally outward away from the outer track surfaces 152 of each of the track members 150, 151. The forward and rearward tabs 154, 155 are each preferably relatively rigid and have rearward ends integrally connected the track members 150, 151. The forward and rearward tabs 154, 155 are sized and aligned for lateral receipt within the forward and rearward apertures 40, 41 of the side frame walls 36, 37 and subsequent engagement with the side frame walls 36, 37 to hold the track members 150, 151 thereon, as described further hereinafter. The central tabs 156 are relatively flexible and have forward ends integrally connected to the respective track members 150, 151. The central tabs 156 each have an outwardly projecting knob 157 thereon which engages the respective central apertures 42 of the side frame walls 36, 37 during assembly, as described further hereinafter.

As best shown in FIGS. 6, 7 and 8, each of the track members 150, 151 has a track portion 160 integrally formed on the inner track surfaces 153. The track portions 160 each have an arcuate shape which is vertically downward at forwardmost ends of the track portions 160 for enabling sliding movement of the housing 50 of the tray assembly 30 at a downward angle into the recessed compartment 20, as described further hereinafter. Each of the track portions 160 preferably includes a laterally-inward extending upper leg 161 and a laterally-inward extending lower leg 162 cooperatively defining a channel portion 163 therebetween.

As shown in FIGS. 6 and 7, each of the track portions 160 includes an integrally molded detent portion 170 located toward the rearward ends of the track portions 160. As best shown in FIG. 7, the detent portions 170 are preferably arcuate-shaped and have forward and rearward edges integrally connected to thinned sections of the upper legs 161 of the track portions 160 and each have a middle portion 173 extending downwardly into the channel portions 163 and forming a gap 164 between the middle portion 173 and the upper leg 161 for permitting flexibility of the detent portion 170. The detent portions 170 engage guide rails 51 on the housing 50 for creating friction and providing smooth sliding movement of the housing 50 relative to the track members 150, 151, as described further hereinafter. The detent portions 170 can also provide dampening to prevent vibration of the housing 50 on the track members 150, 151. Preferably, the track members 150, 151 each include an opening adjacent the detent portion 170 for permitting flexibility of the detent portion 170 and ease in molding, as shown in FIGS. 7 and 8.

The tray assembly 30 further includes a housing 50 preferably integrally molded of a suitable plastic material. The housing 50 is slidably mounted on the track members 150, 151 for movement between an open position in which the tray portions 70, 71 and a cupholder portion 102 is revealed for use by the vehicle driver and passenger and a closed position in which the tray assembly 30 is concealed within the recessed compartment 20 of the instrument panel 11 and conveniently stored out of sight. The housing 50 includes an upper housing wall 52 and first and second side housing walls 53, 54 extending downwardly from the upper housing wall 52. The upper housing wall 52 is generally planar, but includes a forward angled portion 55 for clearance in moving the housing 50 in and out of the downwardly angled recessed compartment 20. The upper housing wall 52 further includes first and second depressions 56, 57 located behind the angled portion 55. Each of the depressions 56, 57 includes a housing aperture 58 for pivotal connection of the tray portions 70, 71, as described further hereinafter. The upper housing wall 52 further includes a housing opening 59 sized for receiving a typical beverage container, such as a pop can or a mug therethrough. The housing opening 59 is generally circular, but includes slot portions 60 for accommodating a handle on a mug for the convenience of either the driver or passenger.

The first and second side housing walls 53, 54 each include an integrally formed guide rail 51 thereon. Each of the guide rails 51 have an arcuate shape which is complementary with the shape of the channel portions 163 of the track portions 160 for sliding engagement therewith. The guide rails 51 each extend generally longitudinally along the side housing walls 53, 54, but with the forward end of the guide rails 51 being angled downwardly to match the downward angle of the track portions 160 and the recessed compartment 20 of the instrument panel 11. Preferably, the guide rails 51 have a generally constant cross-section that matches the shape of the channel portions 163 of the track portions 160. The guide rails 51 are adapted for sliding on the track portions 160 of the track members 150, 151 for movement of the housing 50 between the open and closed positions, as described further hereinafter.

The side housing walls 53, 54 each further include a plurality of cup plate apertures 61 spaced longitudinally apart along the lower edges of the side housing walls 53, 54 for snap-fitted connection of the cup plate 100, as described below. The side housing walls 53, 54 each further include a plurality of face plate apertures 62 spaced vertically apart along the lower edges of the side housing walls 53, 54 for snap-fitted connection of the face plate 133, as described below. The housing 50 also preferably includes a support rib 63 for supporting the vertically higher first tray portion 70 in the deployed position and to minimize contact within the vertically lower second tray portion 71. The support rib 63 is preferably located rearwardly on the housing 50 for supporting a generally rearward portion of the first tray portion 70. It will further be appreciated that an opposing support rib could also be provided to support the second tray portion 71 when it is desired that the second tray portion 71 be spaced from the upper housing wall 52 during movement to reduce friction. It will further be appreciated that the support rib 63 could be covered with a felt or other soft, smooth material.

The tray assembly 30 includes first and second tray portions 70, 71 which are each preferably integrally molded of a plastic material. The tray portions 70, 71 are pivotally mounted on the housing 50 for rotational movement between a deployed position when the housing 50 is pulled out of the recessed compartment 20 and an overlapping position when the housing 50 is in the closed position. The tray portions 70, 71 are conveniently located on opposite sides of the housing 50 when in the deployed position for conveniently holding food items for both the driver and passenger. The tray portions 70, 71 each have generally planar portions 72 which are generally pie-shaped and include a generally straight inner tray edge 73, a generally straight outer tray edge 74, and an arc-shaped tray edge 75 extending between the inner and outer tray edges 73, 74. Each of the arc-shaped tray edges 75 preferably has an upwardly turned lip portion 77 thereon for retaining food items or other small articles on the tray portions 70, 71 during vehicle usage.

Figure 4:
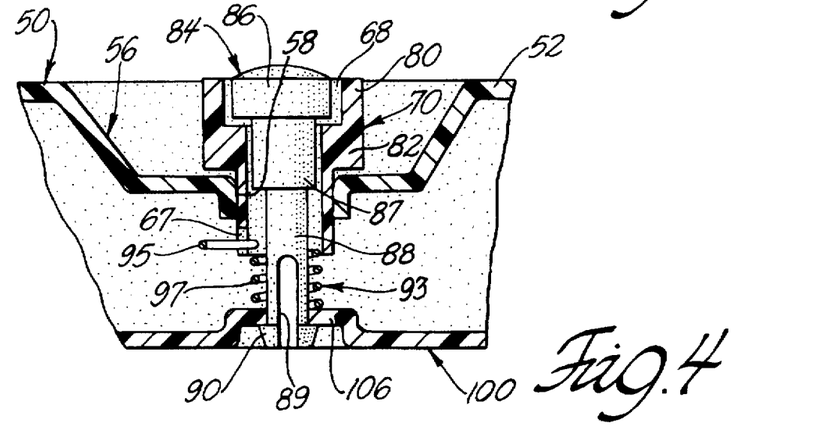
FIG. 4 is a sectional view taken along line 4—4 of FIG. 3.
Figure 5:
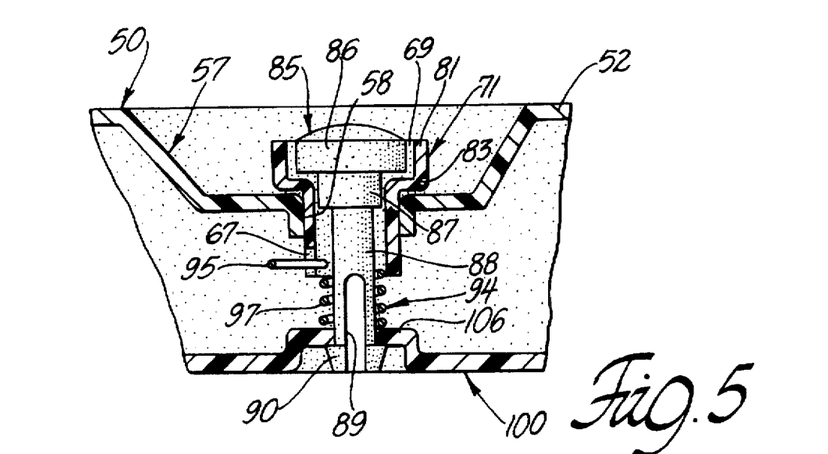
FIG. 5 is a sectional view taken along line 5—5 of FIG. 3.

The first and second tray portions 70, 71 have respective first and second pivot arms 78, 79 extending generally forward from the intersection of the inner and outer tray edges 73, 74. As best shown in FIG. 4, the first pivot arm 78 includes a downward axially extending first bearing 80 and a first shoulder 82 projecting radially inward from the first bearing 80. A first tray opening 68 extends axially through the first bearing 80 for receiving the first pivot pin 84 therethrough to pivotally connect the first tray portion 70 to the housing 50. As best shown in FIG. 5, the second pivot arm 79 includes a downward axially extending second bearing 81 and a second shoulder 83 projecting radially inward from the second bearing 81. A second tray opening 69 extends axially through the second bearing 81 for receiving the second pivot pin 85 therethrough to pivotally connect the second tray portion 71 to the housing 50. It will be appreciated that the first shoulder 82 is vertically thicker than the second shoulder 83 such that the first tray portion 70 is positioned vertically higher than the second tray portion 71. Thus, the first tray portion 70 is overlapped atop the second tray portion 71 when the tray assembly 30 is stored in the recessed compartment, as described further hereinafter.

The first and second pivot arms 78, 79 each include first and second ramped portions 65, 66 which are ramped upwardly from the first and second bearings 80, 81 to the planar portions 72 of the first and second tray portions 70, 71. The ramped portions 65, 66 are shown in the preferred embodiment as having approximately equal ramp angles since the first tray portion 70 is vertically raised above the second tray portion 71 by the height of the first shoulder 82 on the first bearing 80. However, it will be appreciated that the first and second shoulders 82, 83 could alternately have equal heights and the first tray portion 70 could be positioned vertically higher than the second tray portion 71 by a greater angle on the first ramped portion 65 than on the second ramped portion 66. Accordingly, it will further be appreciated that the first and second pivot pins 84, 85 could then be identical. It will also be appreciated that the second tray portion 71 could alternately be overlapped above the first tray portion in the closed position of the housing 50.

It will also be appreciated that the bearings 80, 81 of the tray portions 70, 71 along with the pivot pins 84, 85 are each seated within the depressions 56, 57 on the housing 50. Thus, the pivot pins 84, 85 and the pivot arms 78, 79 of the tray portions 70, 71 do not extend upward above the generally planar portion of the upper housing wall 52 in unequal amounts to provide a more smooth and aesthetically pleasing design. However, it will be appreciated that the depressions 56, 57 could be eliminated and become more planar with the remainder of the upper housing wall 52, if desired.

Each of the first and second bearings 80, 81 includes an axially extending spring slot 67 therein as shown in FIGS.

4, 5, and 6 for receiving upper spring legs 95 of the respective tray springs 93, 94 therein. Preferably, each of spring slots 67 has a lower end which is outwardly tapered for easier assembly of the upper legs 95 into the narrower upper ends of the spring slots 67, as described further hereinafter.

Figure 3:
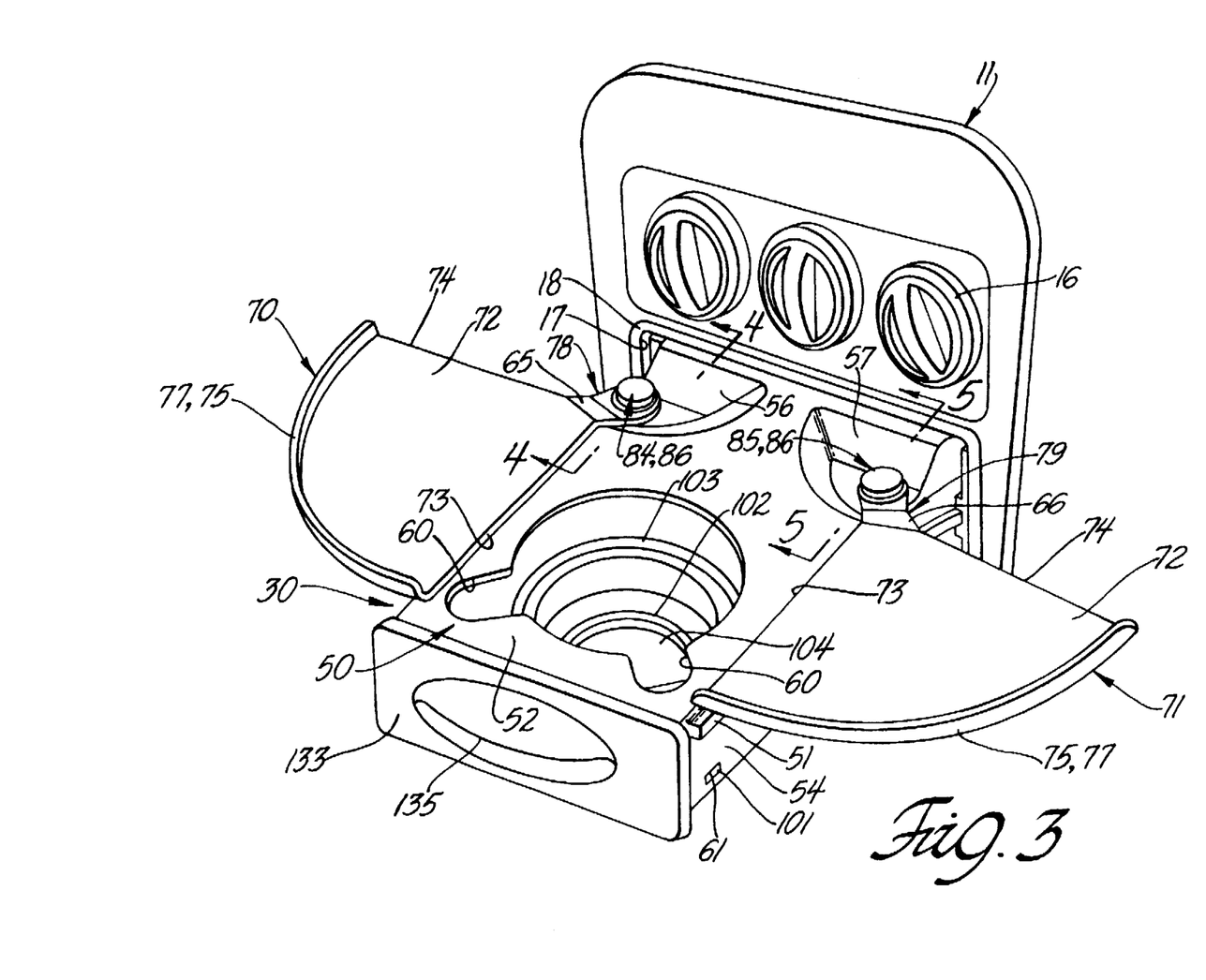
FIG. 3 is a view similar to FIG. 3, but with the housing shown in the open position and the tray assembly in the deployed position.

As shown in FIGS. 3 and 6, the tray assembly 30 includes a cup plate 100 preferably integrally molded from a plastic material. A shown in FIG. 6, the cup plate 100 includes a plurality of longitudinally spaced barbs 101 aligned for snap-fitted engagement within the housing apertures 58 to securely attach the cup plate 100 to the housing 50. The cup plate 100 further includes an integrally molded cupholder portion 102 preferably having an upwardly projecting outer rim 103 for holding the sides of a beverage container and a bottom portion 104 for supporting the bottom of the container. The cupholder portion 102 is axially aligned with the housing opening 59 when the cup plate 100 is assembled to the housing 50. The cupholder portion 102 on the cup plate 100 and the upper housing wall 52 defining the housing opening 59 cooperatively support the beverage container for a vehicle driver or passenger.

Referring to FIGS. 4, 5, and 6, the cup plate 100 further includes plate apertures 105 matably aligned for receiving the pivot pins 84, 85 therethrough. Preferably, the plate apertures 105 are each surrounded by an upwardly projecting boss 106 such that the lowermost edge of the pivot pins 84, 85 are even with the cup plate 100 as shown in FIGS. 4 and 5. The cup plate 100 further includes upwardly projecting spring seats 107 thereon aligned for receiving lower spring legs 96 of the tray springs 93, 94 therein by press-fitted attachment, as described further hereinafter.

Referring to FIGS. 4, 5 and 6, the tray assembly 30 includes first and second tray springs 93, 94 which are preferably coil springs made of a metallic material, such as music wire. The tray springs 93, 94 each have a radially outwardly projecting upper spring leg 95, a radially outwardly projecting lower spring leg 96 and a plurality of vertically-stacked coils 97 therebetween. When the tray assembly 30 is in the assembled condition, the tray springs 93, 94 are positioned between the housing 50 and the cup plate 100 with the lower spring legs 96 pressed into the spring seats 107 of the cup plate 100 and with the upper spring legs 95 slidably seated in the spring slots 67 of the tray bearings 80, 81. The tray springs 93, 94 are coaxially aligned with the plate apertures 105, the bearings 80, 81, the pivot pins 84, 85, and the housing apertures 58 when assembled, as described further hereinafter.

Preferably, the upper and lower spring legs 95, 96 of the tray springs 93, 94 are positioned approximately 75 to 115 degrees relative each other and are shown at approximately 90 degrees relative each other in FIG. 6 in the relaxed condition prior to assembly. However, it will be appreciated that the position of the spring legs 95, 96 in a relaxed condition prior to assembly as shown in FIG. 6, is dependent on the amount of spring biasing force desired on the tray portions 70, 71 in the deployed and overlapped positions. Since the lower spring leg 96 is fixed to the cup plate 100, the upper spring leg 95 trapped in the spring slots is wound by movement of the bearings 80, 81 to produce a spring biasing force which forces the tray portions 70, 71 laterally outward in the clockwise direction on the first tray portion 70 and in a counterclockwise direction on the second tray portion 71. Preferably, the spring biasing force is sufficiently high such that the tray portions 70, 71 quickly and automatically rotate outward to the deployed position shown in FIG. 3 when the housing 50 is in the open position. Also preferably, a slight outward biasing force is desired to lightly force the tray portions 70, 71 against the instrument panel 11 when in the deployed position to prevent rattling and vibration of the tray portions 70, 71. This is accomplished in the preferred embodiment with reference to FIGS. 3 and 6 by the upper and lower spring legs 95, 96 of the tray springs 93, 94 being spaced about 90 degrees apart in the relaxed, unassembled condition and by the tray portions 70, 71 engaging the instrument panel 11 when they have rotated slightly less than 90 degrees to the deployed position such that the spring legs 95, 96 are spaced slightly less than 90 degrees apart when the tray portions 70, 71 are in the deployed position and a slight spring biasing force exists on the tray portions 70, 71.

Referring to FIGS. 4, 5, and 6, first and second pivot pins 84, 85 are preferably integrally molded of a plastic material. The pivot pins 84, 85 each include a radially enlarged head portion 86, a journal portion 87 sized for closely fitting within the respective tray bearings 80, 81, a radially reduced flexible shaft 88 having axial slits 89 for flexibility, and radially outwardly projecting, tapered feet 90 for snap-fitted connection with the bosses 106 of the plate apertures 105. The journal portion 87 of the first pivot pin 84 preferably has a greater height than the journal portion 87 of the second pivot pin 85 for mating with the greater height of the first tray bearing 81. However, it will be appreciated that the first and second pivot pins 84, 85 could be identical for reduction of part tracking during assembly. It will further be appreciated that the head portions 86 could be radially enlarged even further for support and ease of pivotal movement.

The tray assembly 30 further includes a face plate 133 preferably integrally molded of a plastic material. The face plate 133 includes a plurality of forwardly projecting face barbs 134 for engaging the face plate apertures 62 in the housing 50 for snap-fitted connection of the face plate 133 to the housing 50. The face plate 133 includes a handle 135 to permit a vehicle driver or passenger to pull the housing 50 to the open position and to push the housing 50 to a closed position for storage within the recessed compartment 20 such that only the face plate 133 is seen.

While it will be appreciated that many assembly variations as possible, the tray assembly 30 is preferably assembled as follows. A housing sub assembly consisting of all components, except the track members 150, 151 and support frame 34 is preferably assembled as follows. The lower spring legs 96 of the tray springs 93, 94 are each press-fitted into the spring seats 107 of the cup plate 100 such that the tray springs 93, 94 are each seated atop the bosses 106. Next, the barbs 101 of the cup plate 100 are snapped into the cup plate apertures 61 of the housing 50 to snap-fittedly connect the cup plate 100 to the housing 50 and to align the cupholder portion 102 with the housing opening 59.

Next with reference to FIGS. 4, 5, and 6, the first bearing 80 of the first tray portion 70 is inserted through the housing aperture 58 in the first depression 56 until the first shoulder 82 rests against the upper housing wall 52. The first tray portion 70 is placed in a slightly over-opened position such that the larger tapered lower end of the spring slot 67 is aligned to capture the upper spring leg 95 of the first tray spring 93 therein until the upper spring leg 95 is seated in the upper narrower portion of the spring slot 67. Next, the first pivot pin 84 is inserted through the first bearing 80, the corresponding housing aperture 58 and boss 106 on the cup plate 100 until the feet 90 of the first pivot pin 84 snap-fitted engage beneath the boss 106 of the cup plate 100. Thus, the first pivot pin 84 rotatably connects the first tray portion 70 to the housing 50 and cup plate 100. Next, the second tray portion 71 is connected to the upper spring leg 95 of the second tray spring 94, the housing 50 and the cup plate 100 in a similar manner to that described for the first tray portion 70. It will be appreciated that the first and second tray portions 70, 71 could be assembled in opposite orders. Once the tray portions 70, 71 are assembled to the housing 50, the tray springs 93, 94 bias the tray portions 70, 71 outwardly towards the over-opened position.

Next, the plurality of face barbs 134 on the face plate 133 are aligned with mating face plate apertures 62 on the housing 50 and snapped onto the housing 50 to complete the housing subassembly.

Next, a support frame subassembly including the track members 150, 151 and the support frame 34 is assembled. The outer track surfaces 152 of the track members 150, 151 are placed adjacent the inner surfaces 44 of the side frame walls 36, 37. The forward and rearward tabs 154, 155 are laterally aligned with the forward and rearward apertures 40, 41 on the support frame 34 and pushed therein while the central tabs 156 are sligcentral aperture 42. the central aperture 42. The track members 150, 151 are then each translated forward until the forward and rearward tabs 154, 155 engage the side frame walls 36, 37 and until the knobs 157 on the central tabs 156 snap into the central apertures 42 to securely connect the track members 150, 151 to the support frame 34 and complete the support frame subassembly.

Finally, the housing subassembly and support frame subassembly are connected to complete the tray assembly 30. The guide rails 51 of the housing 50 are aligned within the channel portions 163 of the track members 150, 151 and generally slide therein such that the tray portions 70, 71 are inwardly forced into the overlapped position by the support frame 34 and until face plate 133 engages the housing 50 and guide rails 51 are fully seated within the channel portions 163. Thus, it will be appreciated that the completed tray assembly 30 with the tray portions 70, 71 in the overlapped position is a convenient box-like package which can be shipped to the vehicle assembly location.

Finally the entire tray assembly 30 may easily be snapped into the recessed compartment 20 of the instrument panel 11 of a vehicle by simply pushing the tray assembly 30 generally forward and slightly downward into the recessed compartment 20 until the spring fingers 45 snap into the mounting slots 23, as described above. It will further be appreciated that the entire tray assembly 30 is easily removable by pressing the spring fingers 45 laterally inward by the use of a simple tool, such as a screwdriver, through an access hole (not shown) preferably provided in the recessed compartment 20 and pulling the tray assembly 30 rearward out of the recessed compartment 30.

Thus, it will be appreciated that the entire tray assembly 30 is easily assembled together and to the recessed compartment 20 without the use of tools or traditional mechanical fasteners, such as screws for ease of assembly.

With reference to FIGS. 1, 2 and 3, the tray assembly 30 is used in the vehicle as follows. The tray assembly 30 can generally be stored with the housing 50 in the closed position as shown in FIG. 1 such that only the decorative face plate 133 is showing to the vehicle driver and passenger and the tray portions 70, 71 are stored in the overlapped position. The housing 50 is pulled to a partially open position as shown in FIG. 2 by using the handle 135 on the face plate 133. Since the tray springs 93, 94 are continually biasing the tray portions 70, 71 towards the deployed position, as the housing is further pulled rearward to the open position, the tray portions 70, 71 are deployed laterally outward as shown in FIG. 3. It will be appreciated that when the housing is in the open position, the tray portions 70, 71 are slightly biased against the instrument panel 11 by the tray springs 93, 94 to prevent rattling and vibration. As the housing 50 is pulled toward the open position, the guide rails 51 slide within the channel portions 163 of the track members 150, 151 and the mating arcuate shapes enable movement of the housing 50 from a downwardly angled closed position within the recessed compartment 20 to a generally horizontal open position such that the tray portions 70, 71 are approximately horizontal when in use. In addition, the guide rails 51 engage the middle portion 173 of the flexible detent portion 170 for smooth movement of the housing 50 relative the track members 150, 151. It will be appreciated that a stop feature could provided on the guide rails 51 or on the forward end of the housing 50 to prevent over-opening of the housing 50.

Advantageously, the tray assembly 30 is centrally located within the vehicle for ease of access by a driver or passenger. The cupholder portion 102 can be used to hold a beverage container and the tray portions 70, 71 can be used to hold food or other small items.

To close the tray assembly 30, the housing 50 is simply pushed forwardly into the recessed compartment until the tray portions 70, 71 are forced to the overlapped position by the side frame walls 36, 37 and the side walls 21 of the recessed compartment 20 and until the face plate 133 engages the instrument panel 11.

It will be understood that a person skilled in the art may make modifications to the preferred embodiment shown herein within the scope and intent of the claims. For example, the track members 150, 151 could be integral with the support frame 34, or the cup plate 100 could be integral with the housing 50. It will further be appreciated that the channeled portions 163 of the track members 150, 151 could be integral with the recessed compartment 20. It will further be appreciated that the channel portions 163 and the guide rails 51 provide interlocking sliding features between the housing 50 and the support frame 34 or the recessed compartment 20 if located directly thereon, that could be swapped between the components. It will further be appreciated that the tray assembly 30 could also have only one larger tray portion located on a particular side or more than two tray portions. It will further be appreciated that the tray portions 70, 71 could share a single pivot point. It will further be appreciated that the tray portions 70, 71 could have many other geometric shapes other than generally triangular, as long as they are at least generally planar for folding atop the housing 50 for storage. It will further be appreciated that the tray springs 93, 94 could also be other types of springs as long as the tray springs bias the tray portions 70, 71 towards the deployed position. While the preferred embodiment is shown as being stored in a recessed compartment 20 of an instrument panel 11, the tray assembly 30 could also be stored in other recessed compartments located anywhere in the vehicle.

Figure 9:
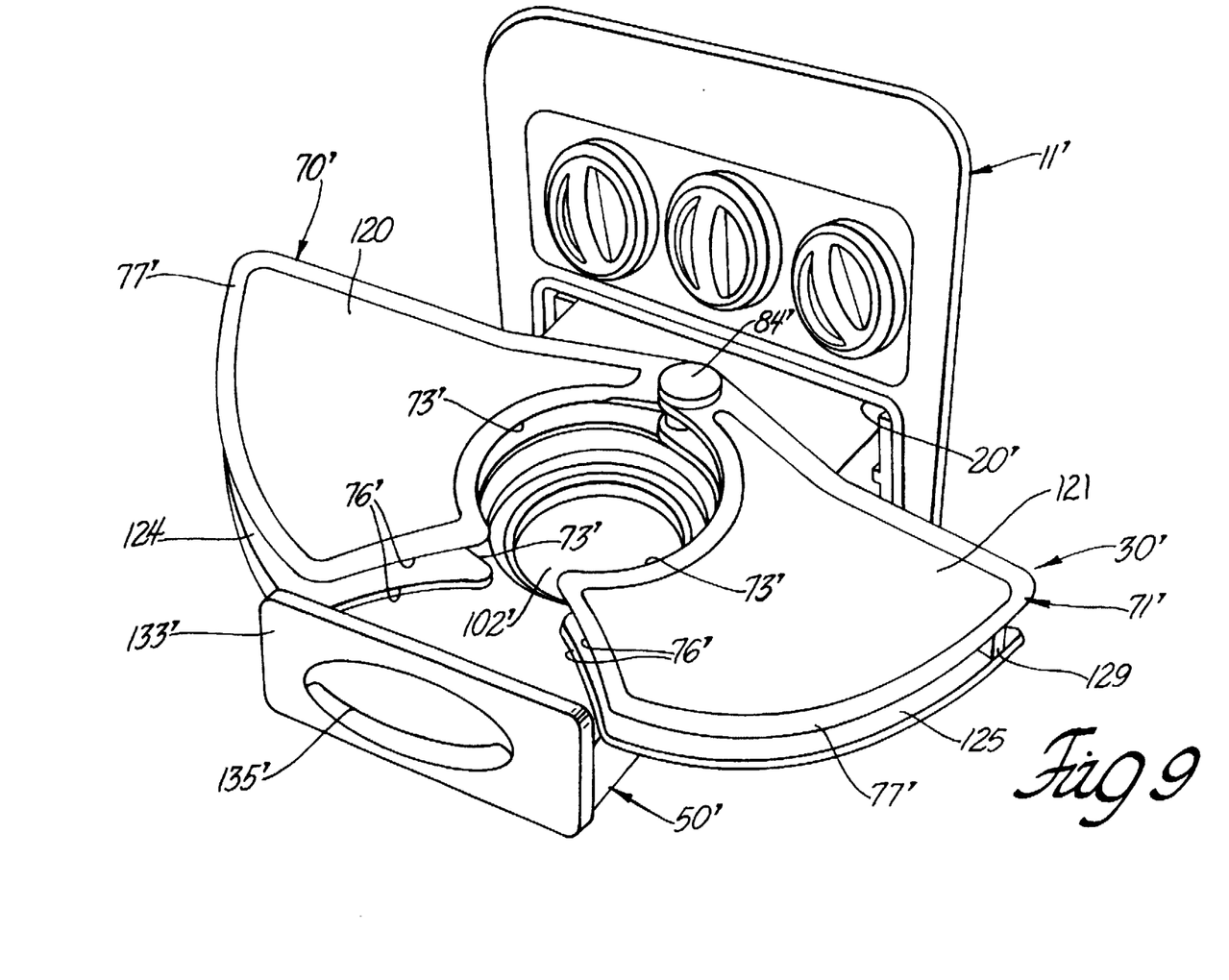
FIG. 9 is a view similar to FIG. 3, but showing an alternate embodiment.

FIG. 9 shows an alternate embodiment of the present invention with similar features denoted by similar reference numerals with a prime. A tray assembly 30' includes the component parts of a housing 50' slidably mounted on a recessed compartment 20' of an instrument panel 11', first and second tray portions 70', 71' pivotally mounted on the housing 50', a single pivot pin 84' for pivotally securing the tray portions 70', 71' to the housing 50', a tray spring (not shown) for biasing the tray portions 70', 71', a cup portion 102' secured to or integrally formed with the housing 50', and a decorative face plate 133' secured to the housing 50'.

The first and second tray portions 70', 71' include first and second upper tray portions 120, 121, respectively, and first and second lower tray portions 124, 125, respectively. The first upper and lower tray portions 120, 124 are each vertically spaced apart and separated by a first support span (not shown). The second upper and lower tray portions 121, 125 are vertically spaced apart and separated by a second support span 129. Each of the tray portions 70', 71' is pivotally connected to the housing 50' by the use of a single pivot pin 84' such that the tray portions 70', 71' both pivot about the same axis. Each of the upper tray portions 120, 121 includes a rounded lip portion 77' which preferably extends around the entire perimeter of the upper tray portions 120, 121. The upper and lower tray portions 120, 121, 124, 125 each have semi-circular forward inner tray edges 73' which cooperatively provide heightened support walls for a beverage container when held in the cupholder portion 102' of the housing 50'. The tray portions 70', 71' each also include rearward inner tray edges 76' which cooperatively define a clearance opening for a mug handle and also define a central food storage compartment between the tray portions 70', 71' and the face plate 133' for holding small food items, such as french fries, therein.

The housing 50' is movable between a closed position in which the housing 50' is stored in the instrument panel 11' and an open position in which the housing 50' is pulled generally rearward of the instrument panel 11' by pulling on a handle 135' of the face plate 133' such that the cupholder portion 102' is accessible to the vehicle driver and passenger. When the housing 50' is in the open position as shown in FIG. 9, the tray portions 70', 71' are biased laterally outward by the tray spring to a deployed position in which the beverage container can be stored in the cupholder 102' and food items can be stored on the generally horizontal tray portions 70', 71'. The housing 50' is movable to a closed position in which the housing 50' is stored within the instrument panel 11' and the tray portions 70', 71' are folded inwardly to an overlapped position. In the overlapped position it will be appreciated that the upper and lower tray portions 120, 121, 124, 125 overlap and interlock with each other. For example in the overlapped position, the second upper tray portion 121 is positioned vertically above the first upper tray portion 120 which is positioned vertically above the second lower tray portion 125 which is positioned vertically above the first lower tray portion 124. Thus, the upper and lower tray portions 120, 121, 124, 125 are preferably stored in a stacked and interlocking condition.

Figure 10:
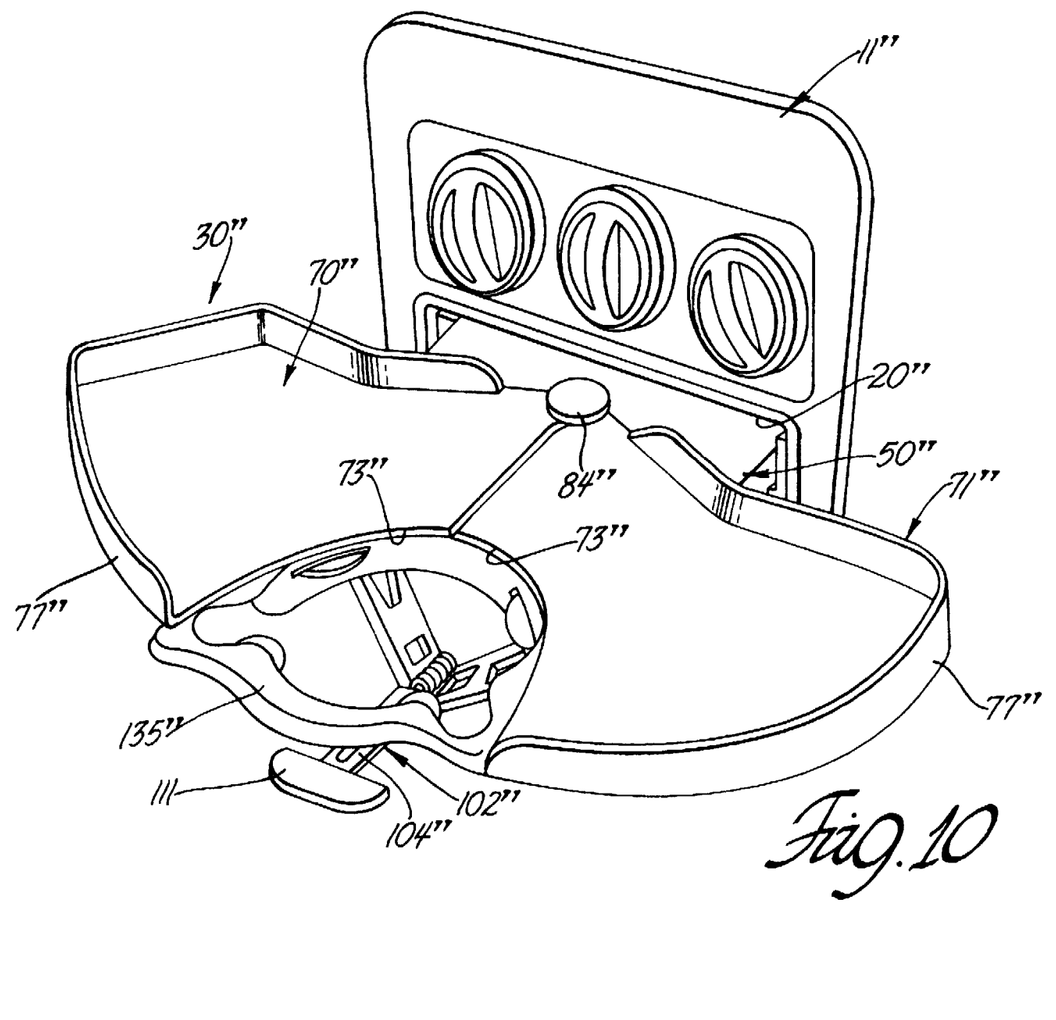
FIG. 10 is a view similar to FIG. 3, but showing another alternate embodiment.

FIG. 10 shows an alternate embodiment of the present invention with similar features denoted by similar reference numerals with a double prime. A tray assembly 30" includes the component parts of a housing 50" slidably mounted on a recessed compartment 20" of an instrument panel 11", first and second tray portions 70", 71" pivotally mounted on the housing 50", a single pivot pin 84" for pivotally securing the tray portions 70", 71" to the housing 50", a tray spring (not shown) for biasing the tray portions 70", 71", a cupholder portion 102" secured to the housing 50" and having a cupholder foot 111 which pops down to provide the bottom portion 104" of the cupholder portion 102", and a decorative pull handle 135" secured to the housing 50".

The first and second tray portions 70", 71" are pivotally connected to the housing 50" by the use of a single pivot pin 84" such that the tray portions 70", 71" both pivot about the same axis. Each of the tray portions 70", 71" includes an enlarged lip portion 77" which preferably extends around the entire perimeter of the tray portions 70", 71". The tray portions 70", 71" each have semi-circular inner tray edges 73" which cooperatively provide heightened support walls for a beverage container when held in the cupholder portion 102" of the housing 50".

The housing 50" is movable between a closed position in which the housing 50" is stored in the instrument panel 11" and an open position in which the housing 50" is pulled generally rearward of the instrument panel 11' by pulling on a handle 135" of the housing 50" such that the cupholder portion 102" is accessible to the vehicle driver and passenger. When the housing 50" is pulled to the open position, the cupholder foot 111 pops downwardly to form the bottom portion 1041" of the cupholder portion 102". Also when the housing 50" is in the open position as shown in FIG. 10, the tray portions 70", 71" are biased laterally outward by the tray spring to a deployed position in which the beverage container can be stored in the cupholder 102" and food items can be stored on the generally horizontal tray portions 70", 71". The housing 50" is movable to a closed position in which the housing 50" is stored within the instrument panel 11" and the tray portions 70", 71" are folded inwardly to an overlapped position.

While the present embodiment has been described as carried out in a specific embodiment thereof, it is not intended to be limited thereby, but is intended to cover the invention broadly within the scope and spirit of the claims.

What is claimed is:

1. A tray assembly for use in a vehicle having a recessed compartment, the tray assembly comprising:

a housing adapted to be slidably mounted on the recessed compartment for movement between an open position in which the housing is substantially outside the recessed compartment and a closed position in which the housing is substantially concealed within the recessed compartment;

at least one generally planar tray portion pivotally connected to the housing for movement between a laterally outward deployed position when the housing is in the open condition and a laterally inward folded position when the housing is in the closed position;

at least one pivot pin for pivotally mounting the tray portion to the housing;

a coil spring surrounding the pivot pin, the coil spring for biasing the tray portion laterally outward towards the deployed position; and a cup plate disposed on the housing, the cup plate having a cupholder portion thereon, the pivot pin engaging the cup plate, and the coil spring including one end engaging the cup plate and another end engaging the tray portion for biasing the tray portion laterally outward towards the deployed position.

2. The tray assembly of claim 1 wherein the tray assembly includes first and second tray portions and wherein a cupholder portion is disposed on the housing, the cupholder portion being located between the first and second tray portions when the tray portions are in the deployed position.

3. A tray assembly adapted to be mounted in a vehicle having a recessed compartment, the tray assembly comprising:

a housing adapted to be slidably mounted within the recessed compartment for movement between an open position in which the housing is substantially outside the recessed compartment and a closed position in which the housing is stored within the recessed compartment;

first and second tray portions pivotally mounted on the housing for movement between a laterally outward deployed position when the housing is in the open position and a laterally inward overlapped position when the housing is in the closed position in which one of the tray portions overlaps another of the tray portions; and the tray assembly including a cup plate mounted below the housing, the cup plate having a cupholder portion thereon and the tray assembly including first and second springs each having one end engaging the cup plate and each having another end engaging one of the tray portions for biasing each of the tray portions laterally outward towards the deployed position.

4. The tray assembly of claim 3 wherein the tray assembly includes a decorative face plate mounted to the housing, the face plate including a handle thereon for pulling the housing towards the open position.

5. The tray assembly of claim 3 wherein the tray assembly includes a support frame adapted to be secured within the recessed compartment and first and second track members mounted on the support frame and wherein the housing is slidably mounted on the track members.

6. A tray assembly adapted to be mounted in a vehicle having a recessed compartment, the tray assembly comprising:

a housing adapted to be slidably mounted within the recessed compartment for movement between an open position in which the housing is substantially outside the recessed compartment and a closed position in which the housing is stored within the recessed compartment; and first and second tray portions pivotally mounted on the housing for movement between a laterally outward deployed position when the housing is in the open position and a laterally inward overlapped position when the housing is in the closed position in which one of the tray portions overlaps another of the tray portions;

the tray assembly including a support frame adapted to be secured within the recessed compartment and first and second track members disposed on the support frame and wherein the housing is slidably mounted on the track members;

the track members each including a channel portion thereon and the housing including a pair of corresponding guide rails thereon for sliding movement within the channel portions.

7. The tray assembly of claim 6 wherein the channel portions each include a detent portion having ends connected to the track members and having middle portions defining gaps such that the middle portions of the detent portions flexibly engage the guide rails when moving within the channel portions.

8. The tray assembly of claim 6 wherein the tray assembly includes at least one pivot pin for pivotally mounting the tray portions to the housing.

9. The tray assembly of claim 6 wherein the tray assembly includes first and second pivot pins being laterally spaced apart for pivotally mounting the first and second tray portions, respectively, to the housing.

10. The tray assembly of claim 6 wherein the tray assembly includes spring means for biasing the tray portions laterally outward towards the deployed condition.

11. The tray assembly of claim 6 wherein the tray assembly includes a cup plate mounted below the housing, the cup plate having a cupholder portion thereon and wherein the tray assembly includes first and second springs each having one end engaging the cup plate and each having another end engaging one of the tray portions for biasing each of the tray portions laterally outward towards the deployed position.

12. The tray assembly of claim 6 wherein the housing includes a cupholder portion positioned between the first and second tray portions when the housing is in the open position and the tray portions are in the deployed position.

13. A tray assembly adapted to be mounted in a vehicle having a recessed compartment, the tray assembly comprising:

a housing adapted to be slidably mounted within the recessed compartment for movement between an open position in which the housing is substantially outside the recessed compartment and a closed position in which the housing is stored within the recessed compartment; and first and second tray portions pivotally mounted on the housing for movement between a laterally outward deployed position when the housing is in the open position and a laterally inward overlapped position when the housing is in the closed position in which one of the tray portions overlaps another of the tray portions, the housing including a cupholder portion positioned between the first and second tray portions when the housing is in the open position and the tray portions are in the deployed position; the tray portions having inner edges spaced above the cupholder portion and wherein the inner edges cooperatively vertically extend the height of the cupholder portion.

14. A tray assembly adapted to be mounted in a vehicle having a recessed compartment, the tray assembly comprising:

a housing adapted to be slidably mounted within the recessed compartment for movement between an open position in which the housing is substantially outside the recessed compartment and a closed position in which the housing is stored within the recessed compartment; and first and second tray portions pivotally mounted on the housing for movement between a laterally outward deployed position when the housing is in the open position and a laterally inward overlapped position when the housing is in the closed position in which one of the tray portions overlaps another of the tray portions;

the tray portions each including an upper tray portion and a lower tray portion and wherein each respective pair of upper and lower tray portions are vertically spaced apart by a support span and wherein the tray portions are stored in a stacked condition in the overlapped position with one of the upper tray portions spaced vertically above the other of the upper tray portions and wherein one of the lower tray portions is spaced vertically below the other of the upper tray portions and vertically above the other of the lower tray portions.

15. A tray assembly for use in a vehicle having a recessed compartment, the tray assembly comprising:

a housing adapted to be slidably mounted within the recessed compartment for movement between an open position in which the housing is substantially outside of the recessed compartment and a closed position in which the tray assembly is substantially concealed within the recessed compartment;

first and second tray portions pivotally connected to the housing for movement between a laterally outward deployed position when the housing is in the open position and a laterally inward overlapped position when the housing is in the closed position;

a cup plate secured to the housing;

first and second coil springs each having one end engaging the cup plate and each having another end engaging one of the tray portions for biasing each of the tray portions laterally outward towards the deployed position;

a cupholder portion disposed on the cup plate, the cupholder portion being located between the tray portions when the tray portions are in the deployed position; and first and second pivot pins being laterally spaced apart for pivotally connecting the first and second tray portions to the housing and cup plate, the first and second pivot pins each positioned within the respective first and second coil springs.

16. The tray assembly of claim 15 wherein a decorative face plate having a handle is disposed on the housing for pulling the housing towards the open position.

17. The tray assembly of claim 15 wherein the tray portions each include an upper tray portion and a lower tray portion and wherein each respective pair of upper and lower tray portions are vertically spaced apart by a support span and wherein the tray portions are stored in a stacked condition in the overlapped position with one of the upper tray portions spaced vertically above the other of the upper tray portions and wherein one of the lower tray portions is spaced vertically below the other of the upper tray portions and vertically above the other of the lower tray portions.

* * * * *